July 15, 1958 P. J. WEAVER 2,843,235
PARTIAL BRAKE SYSTEM
Filed Aug. 10, 1956
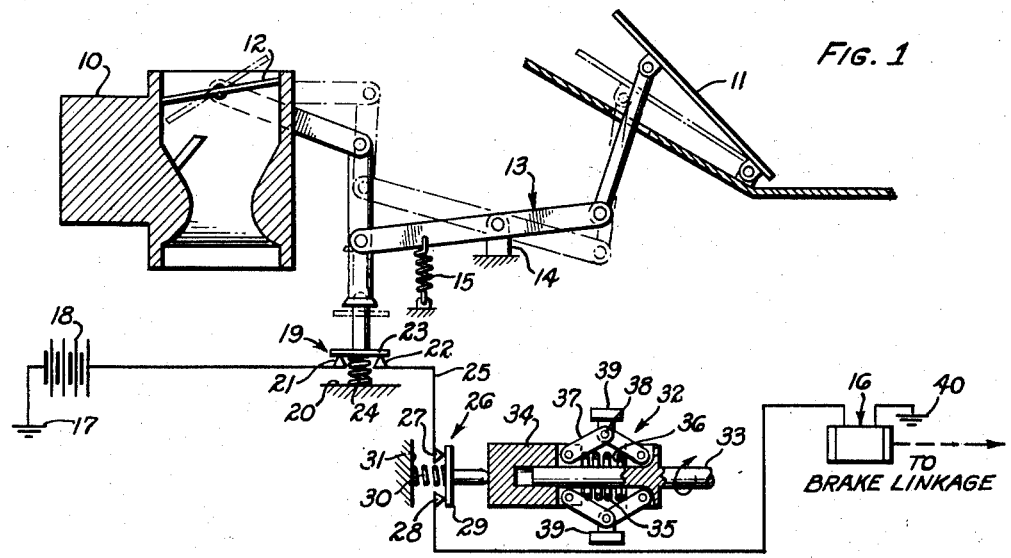
FIG. 1
FIG. 2
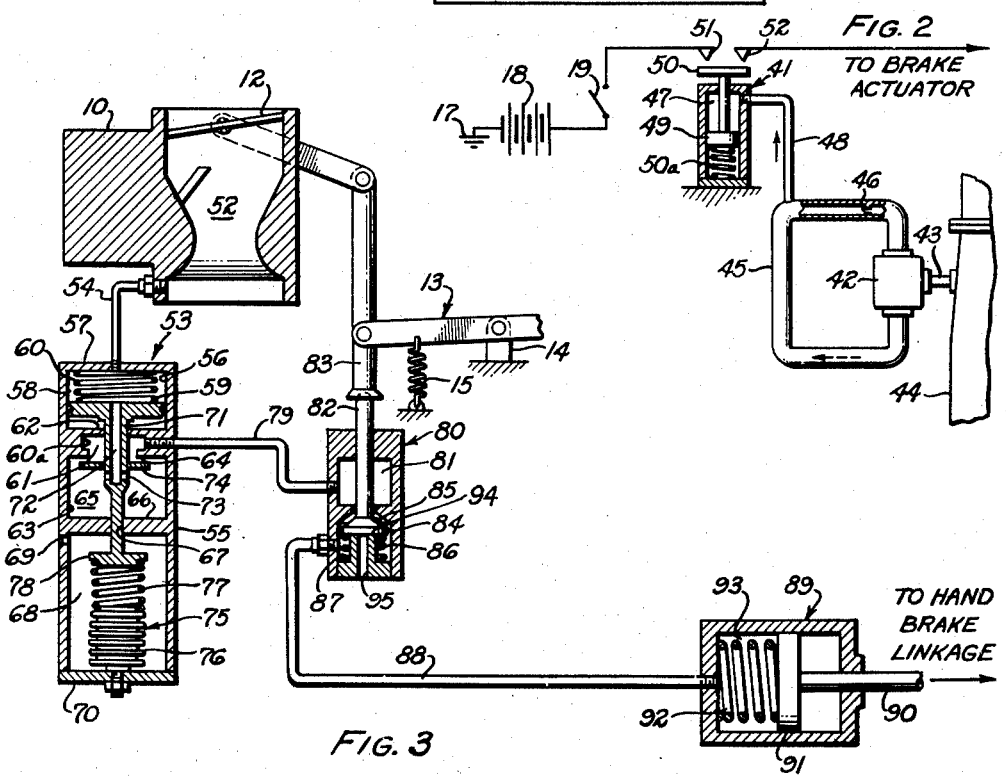
FIG. 3
INVENTOR,
PAUL J. WEAVER
BY
D. Gordon Angus
ATTORNEY

United States Patent Office 2,843,235
Patented July 15, 1958

---

2,843,235

PARTIAL BRAKE SYSTEM

Paul J. Weaver, Paramount, Calif.

Application August 10, 1956, Serial No. 603,257

17 Claims. (Cl. 192—3)

This invention relates generally to braking systems for motor vehicles and more particularly to a system for causing application of the brakes of a vehicle in response to a concurrent reduction in vehicle speed and release of the foot throttle.

In bringing a motor vehicle to a stop under normal operating conditions, the foot of the operator is first removed from the foot throttle or accelerator pedal. Unless the motor is disconnected from the drive shaft, the continuing momentum of the vehicle drives the motor as a compressor, and the engine acts as a brake, whereupon the motor tries to slow down to its normal idling speed (generally equivalent to a vehicle speed of about 5 miles per hour on cars having an automatic transmission). This brake power is exerted while there is a difference between ordinary engine idling speed and the speed at which the engine is driven by the momentum of the vehicle, and therefore continues to act until the vehicle has reached a road speed which is approximately equivalent to the vehicle speed at which the car would be driven by its engine when operating at idling speed (hereafter called "idling speed"). After the car has slowed to idling speed, an external additional braking force must be applied in order to bring the vehicle to a stop, since the engine would tend to keep the car in motion at the idling speed.

It is an object of this invention to provide means for automatically applying a braking force to the vehicle at or about the time the vehicle speed declines to its idling speed, whereby the vehicle is brought to a smooth and complete stop without requiring the operator to apply his brake, and which gives the sensation to the driver that there is continuous motor "compression" braking from the time he removes his foot from the accelerator until the vehicle has come to a complete stop. The braking force used for applying the brakes automatically is small being about 10% of the amount that can be applied by normal manual actuation.

In addition to the above operational features, automobiles which employ torque converters or other types of fluid couplings for automatic transmissions generally "creep" at stops, due to the fact that even at a stop, the fluid coupling ordinarily remains engaged and transmits torque to the wheels from the engine. This torque is caused by the idling operation of the engine and tends to operate the car at idling speed. A further object of this invention is to provide a braking system which automatically applies the vehicle brakes to prevent creep, and hold cars with an automatic transmission at a stop without requiring the driver to apply the brakes.

Numerous automatic braking systems have been devised and are known to the prior art. Most of the prior art devices, however, fall into one of two classifications, (a) those systems in which the brakes are actuated by the release movement of the accelerator pedal, and (b) those which merely hold the brakes on after they have been manually applied by the driver. In this invention, the brakes are powered to the determined limited amount by a separate power source which is actuated by signals responsive to accelerator position and to vehicle speed, and does not require any braking operation on the part of the driver.

This invention is carried out in connection with an automotive vehicle provided with an engine, an accelerator lever or pedal, and a braking system. A means for applying the brake is actuated by a power source which incorporates vehicle speed responsive means and accelerator responsive means for controlling the application of power to apply the brakes, so as to limit the automatic actuation of the brake applying means to predetermined conditions.

A preferred but optional feature of the invention resides in an electrically operated brake actuator which is caused to apply the brakes in response to current from an electrical circuit which incorporates a first switch responsive to the vehicle speed and a second switch which is responsive to accelerator pedal position, whereby a concurrent engine-idle pedal setting, and an idling vehicle speed cause the two switches to complete a circuit and pass electric energy to apply the brakes through the actuator.

Still another optional feature of the invention resides in powering a brake actuator by means of a differential pressure secured from the carburetor, and means permitting the application of said differential pressure to the actuator when the accelerator pedal is in an engine-idle position.

The above and other features of this invention will be fully understood from the following detailed description and the accompanying claims, in which:

Fig. 1 is a schematic view, partly in cross-section and partly in elevation, of the presently preferred embodiment of the invention;

Fig. 2 is a fragmentary schematic view, partly in cross-section, of a vehicle speed-responsive switch which may be incorporated in the system of Fig. 1; and Fig. 3 is a schematic view, partly in cross-section and partly in elevation, of still another embodiment of the invention.

The presently preferred form of the invention is illustrated in Fig. 1, which shows a carburetor 10, an accelerator pedal 11, and a butterfly valve 12, sometimes called the throttle. The accelerator pedal, sometimes called the speed control, is connected to the butterfly valve by means of a conventional linkage 13 mounted to a pivot 14, with the linkage biased by spring 15. The effect of spring 15 is to lift the accelerator pedal and slow the flow of air through the throat of the carburetor by closing the butterfly valve.

A brake actuator 16, which may conveniently be an electromechanical solenoid, is connected to a brake linkage (not shown) so as to apply the brakes to a limited degree when the electrical circuit to the solenoid is completed. The electrical circuit to said brake actuator extends from a ground 17 through a battery 18 (the source of power) to an accelerator pedal-responsive switch 19 which is responsive to the position of the accelerator pedal. Switch 19 may be termed an "override switch," since depression of the pedal breaks the circuit and overrides the power means. Switch 19 is mounted to a structure 20 which may for example be the firewall of the engine compartment, or the engine block. This switch has two contacts 21, 22 which may be bridged by contactor 23. This contact 23 is biased by a spring 24 so that the repose position of said switch is open and breaks the circuit to the solenoid.

The linkage 13 and switch 19 are shown in solid line in Fig. 1 to illustrate the idle condition with the pedal released and elevated by spring 15. In this condition, the contactor 23 makes a circuit between the contacts 21 and 22. In dotted line, the linkage, pedal, and switch are shown in the power-on position, with the circuit opened by switch 19.

A lead 25 connects the accelerator pedal responsive switch 19 in series relationship with a vehicle speed responsive switch 26. This vehicle speed responsive switch has contacts 27, 28, which can be bridged by a contactor 29. This contactor is biased away from the contacts by means of a coil spring 30 which is opposed between contactor 29 and a supporting structure 31. The switch 26 is actuated by means of a governor control generally designated by the numeral 32. This governor control includes a rod 33 which is rotated by a connection such as speedometer cable or some other part which rotates at a speed proportional to the speed of the wheels of the vehicle. A sliding member 34 is slidably disposed over the end of rod 33 and is biased to the left in Fig. 1, by means of a compression spring 35 opposed to a shoulder 36 on the rod. A plurality of toggle links 37 which are jointed by pivots 38 are mounted to the sliding body and to the rod to join them together. Weights 39 are attached at the pivot 38 so that increasing rotational velocity of the rod 33 tends to throw the weights radially outward and thus cause the toggle links to pull the sliding body toward the right. The contactor is then moved off contacts 27 and 28 by the spring 30.

By the judicious selection of the size and weight of the toggle links 37 and the weights 39, as well as the modulus of the spring 35, the speed responsive device 32 will permit the switch 26 to remain open at all vehicle speeds above a predetermined minimum vehicle speed. When the speed approaches that which corresponds to the idling speed of the vehicle, the spring pushes member 34 against contactor 29, and the circuit is thus closed at the vehicle speed responsive switch.

In Fig. 2 there is shown an alternate vehicle speed responsive switch 41, which may be directly substituted for the switch 26 and the vehicle speed responsive device 32, and thus incorporated in the system of Fig. 1.

Switch 41 comprises a fluid pump 42 which may be driven by connection 43 to the speedometer cable or connected to the wheels, or some other moving part whose speed is proportional to vehicle speed. Pump 42 circulates liquid through a closed hydraulic loop conduit 45 which has an orifice 46 therein so that pressure to the left of orifice 46 in Fig. 2, will increase as the speed of the pump is increased. A pressure chamber 47 is connected by conduit 48 to the loop 45 and has within it a reciprocable piston 49 attached to a contactor 50. A decrease in the pressure in the chamber 47 causes the piston to move so as to press contactor 50 against contacts 51 and 52 so as to complete the circuit to the brake actuator.

In Fig. 3 the carburetor 10 is shown with its butterfly valve 12 connected to the linkage 13 from the accelerator pedal as in Fig. 1. The venturi throat 52 of the carburetor is shown disposed beneath the butterfly valve. The flow of air is downward through the carburetor.

A vehicle speed responsive valve 53 is connected by means of tubing 54 to the low-pressure region beneath the venturi throat 52. This valve, which is pressure-sensitive, includes a housing 55 having an axial bore 56 enclosed by suitable cover 57 to define a piston chamber 58 for the reception of a reciprocable piston 59. The piston 59 is biased downwardly by means of a coil spring 60.

The housing 55 is also formed with a second axial bore 60a of a smaller diameter than the bore 56, which defines a manifold chamber 61 separated from the piston chamber 58 by means of an annular shoulder 62. The housing 55 also has a third bore 63 adjacent to and interconnecting with the chamber 61. A valve seat 64 is disposed between the chamber 61 and chamber 65.

Bore 63 is terminated by an annular shoulder 66 which has a passage 67 therethrough interconnecting with a chamber 68 beneath said shoulder 66. Chamber 68 is vented to atmosphere by a port 69. Chamber 68 is closed at its lower end by end plate 70.

A piston rod 71 is connected to piston 59, and the rod has a passage 72 extending axially from the upper face of the piston so as to be in fluid communication with the chamber 58, and thus with the venturi throat. Passage 72 terminates at ports 73 which open into chamber 65 beneath valve seat 64, and below a valve shoulder 74. This valve shoulder is fixed to the piston rod, and when the piston is in its uppermost position the shoulder presses on valve seat 64 so as to separate chambers 61 and 65 from fluid communication with each other.

Within chamber 68 there is an altitude compensating device 75 which may conveniently comprise an aneroid 76 in the form of an evacuated bellows, and a spring 77, both opposed between the end plate 70 and a retainer 78 on the end of the piston rod. Vent 69 admits atmospheric pressure to chamber 68.

Manifold chamber 61 is connected by a conduit 79 to an accelerator pedal responsive valve 80 (sometimes called an "override" valve). Valve 80 has a reservoir chamber 81 connected by conduit 79 to chamber 61, and a poppet 82 which makes an abutting connection with a push rod 83 which is a portion of accelerator linkage 13. This poppet has a conical plug 84 beneath said chamber 81 adapted to close passage 85 in which the poppet reciprocates. This poppet is spring-loaded closed by means of a spring 86. The spring is disposed in a relief chamber 87 beneath the poppet, so that when the passage is open, chambers 81 and 87 are in communication. Chamber 87 is tapped by conduit 88 which conducts pressure therefrom to a brake actuator 89 corresponding to the solenoid 16 of the system of Fig. 1.

The piston rod 90 of the brake actuator may be connected to a brake linkage (not shown). The rod is connected to a piston 91 which is opposed by a spring 92 within chamber 93 in said actuator. Pressure from conduit 88 is provided to chamber 93 so as to move the piston 91 therein and apply the brakes at the appropriate time.

A relief valve seat 94 is disposed in line with poppet 82, and a relief vent 95 extends from the atmosphere to said seat. The poppet closes the vent 95 when the poppet is pressed down, and opens valve passage 85. The relief vent is open when the passage 85 is closed by the poppet.

The operation of the system of Fig. 1 will now be described. When the accelerator pedal 11 is depressed as shown in the dotted line, the brake actuation system is rendered inoperative, because the linkage 13 raises contactor 23 so that the override switch 19 is open. When vehicle speed is above the maximum for automatic brake operation, governor control 32 likewise renders the system inoperative by permitting the retraction of contactor 29 to open vehicle speed responsive switch 26. Therefore two prerequisites are set for automatic brake actuation: (1) release of the accelerator pedal, and (2) a suitably low vehicle speed.

When the accelerator pedal is released, spring 15 pulls linkage 13 so that the pedal is raised, the butterfly valve 12 is closed, and contactor 23 is pressed against contacts 21 and 22. The override switch is now closed, but so long as vehicle speed remains above the maximum for brake actuation, the brakes will not be automatically applied.

As the vehicle slows down because of engine compression, or manual brake application, or both, the governor 32, which is turned at a rate proportional to vehicle speed, has less centrifugal energy. The toggle links 37 and weights 39 therefore exert progressively less compressive force on spring 35, and the spring therefore moves contactor 29 toward contacts 27 and 28. When the maximum speed for automatic brake actuation is reached, the contactor 29 will bridge the two contacts, and vehicle speed responsive switch 26 will be closed. This coincidence of switch closing and of vehicle speed can be achieved by the judicious selection of the mass and configuration of the weights and toggles, and by the proper choice of spring strength for spring 35, and for spring 30, which latter normally biases the switch open.

When both switches are closed, the circuit is complete from ground 17 through battery 18, to the brake actuator 16, and thence to ground. The brake actuator is connected to the brake linkage to actuate the brakes.

The operation of the embodiment of Fig. 2 is substantially the same as that of Fig. 1. Override switch 19 is the same as that in Fig. 1, but is not shown in detail in Fig. 2. Pump 42 rotates at a rate proportional to vehicle speed, and in view of the closed pumping circuit which includes the orifice 46, produces a pressure in conduits 45 and 48 which is proportional to vehicle speed. Above the maximum automatic braking speed, the pressure in chamber 47 will hold the switch open by retracting piston 49 and contactor 50 from contacts 51 and 52. When the pressure drops due to low vehicle speed, the bias spring 50a moves the piston and the contactor toward the contacts to close the switch. Therefore the vehicle speed responsive means of Fig. 2 operates in the same manner as that of Fig. 1, except, of course, that in Fig. 1 the switch is biased open and in Fig. 2 it is biased closed. In either event, the switch can only be closed when the vehicle speed is below the maximum desired automatic braking speed.

When the vehicle speed responsive means of Fig. 2 are closed, along with the override switch 19, the brakes will be applied by power supplied to a brake actuator from battery 18, just as in the system of Fig. 1.

The embodiment of Fig. 3 obtains braking power from the engine manifold instead of from a battery. The accelerator pedal linkage position illustrated in Fig. 3 is for "power off"; that is, the pedal is released, and the spring 15 has pulled the linkage down to close butterfly valve 12.

When the accelerator pedal is depressed, the butterfly valve is opened. This movement lifts push rod 83, and allows poppet 82 to move upward. This condition is not illustrated, because it is obvious from the drawings.

As will be set forth in further detail below, the system of Fig. 3 as illustrated is in a brake-actuating condition. With the accelerator pedal released, the spring 15 has pulled the push rod down against poppet 82, and the poppet bears against the relief valve seat 94 to close relief vent 95 in the override valve 80. This movement serves to open passage 85, so that conduit 88 is connected to reservoir chamber 81 and thence to chamber 61 in the vehicle speed responsive valve through conduit 79. In this condition, the override valve excludes atmospheric pressure from entry through relief vent 95, and permits low pressure to reach the brake actuator 89 from the vehicle speed responsive valve.

The vehicle speed responsive valve 53 is biased by spring 60 so that its piston 59 and rod 71 are held down when near-atmospheric pressures are exerted in piston chamber 58 above the piston. Negative pressures of increasing magnitude in the engine manifold tend to draw the piston upwardly against the spring 60. With the engine idling, the throttle closed, and the automobile slowing down, the negative pressure in the manifold decreases (that is, approaches atmospheric), until finally the force from the differential pressure on the piston is less than the spring force, and the piston is moved down. This condition is caused to occur at the manifold pressure corresponding to maximum automatic brake actuating speed, by judicious selection of springs 60 and 77.

When the piston moves down, it removes valve shoulder 74 from valve seat 64, and manifold pressure passes through passage 72 in the rod and ports 73, and thence to chamber 61, from which it passes to the override valve 80. If both valves are simultaneously open as illustrated, manifold pressure, which is negative at all operating speeds of non-supercharged engines, draws piston 91 and rod 90 to the left as shown in Fig. 3 to actuate the brakes.

Spring 92 is selected so as to release the brakes unless negative pressure is applied from the manifold.

If the accelerator pedal be depresesd, then push rod 83 will be lifted, and poppet 82 will rise because of the force from spring 86. This closes passage 85, and opens relief vent 95. Atmospheric pressure then enters chamber 93 of the brake actuator 89, and the spring 92 moves rod 90 to release the brakes.

During compression braking the butterfly valve is closed thus causing a high vacuum or negative pressure. As the idle speed is reached this negative pressure is at a lesser value because the engine is revolving slower. Although this is still a relatively high negative pressure it is less than during the peroid when the engine is being overdriven by the velocity of the wheels being greater than the normal speed for engine idling conditions. During this period (compression braking), the negative pressure in the engine manifold will increase in magnitude, and the piston 59 will be drawn upward. This seats the valve shoulder 74 on the valve seat 64, and closes the means of communication of manifold pressure to the override valve. Therefore, the larger negative manifold pressures which correspond to velocities higher than that representative of the maximum automatic braking speed, close the valve 53, and prevent automatic braking.

Since manifold pressures vary with altitudes the aneroid 76 is provided for the purpose of varying the load opposed to spring 60. At higher altitudes, where atmospheric or normal pressures are lower, then the counter-load against spring 60 as exerted by the aneroid and spring 77, which is preloaded by the aneroid, must be increased. The evacuated bellows serves this purpose.

It will be appreciated that in all embodiments shown, power is applied to the brakes from a power source. The power is transmitted through a system which has two control elements in series: a vehicle speed responsive valve, and an override valve. Without the simultaneous concurrence of both control elements, the brakes cannot be automatically applied by the system. With their simultaneous concurence, the brakes will be applied by the power source.

It is neither necessary nor desirable for the brakes to be applied full force by this system. The larger proportion of brake control is intended to be left to the operator, although total application of brakes is within the scope of this invention. It presently appears that an application of 10% of the brakes' power will suffice to give a steady reduction in speed.

By providing the valves in series (electric switches being regarded as "valves" for electricity), the brakes will not be applied at inopportune times. Even at slow vehicles speeds or stops, the brakes will not be applied when the accelerator is depressed, since the override valve acts as a cut off. At high coasting speeds with the accelerator pedal released the brakes will not be applied because the vehicle speed responsive valve acts as a cut off.

It will further be seen that these systems do not limit the application of brakes by the driver. They simply are an automatic means for applying the brakes to slow the vehicle to speeds below some desired maximum automatic brake actuation speed, one example of which is the vehicle speed which corresponds to engine idling speed. The operator still has full control over the brakes.

It will be understood that the use of the words "series" or "series relations" herein or in the appended claims, are intended to include in a power circuit a plurality of valve means or mechanisms either electrical, hydraulic, pneumatic, or a combination thereof, all of which must be concurrently in actuating or operable condition in order for power to flow through said circuit to actuate the brake operating system.

This invention is not to be limited by the embodiments shown in the drawing and described in the description, which are given by way of example, and not of limitation, but only in accordance with the scope of the appended claims.

I claim:

1. In a vehicle having speed control means and a braking system, actuating means for applying said braking system, vehicle speed-responsive means, and speed control responsive means, said speed responsive means and speed control responsive means being in series relationship with said actuating means, whereby said actuating means can apply the brakes only when said speed responsive means and speed control responsive means concurrently permit said application.

2. In a vehicle having an engine, an accelerator foot pedal and a braking system, means for actuating said braking system including: a brake actuating member; means responsive to vehicle speed and operable under a predetermined maximum absolute pressure to cause actuation of said brake actuating member; and override control means responsive to said foot pedal and adapted to prevent actuation of said brake actuating means when said pedal is depressed.

3. In a vehicle having a throttle and a braking system, means for actuating said braking system including: means responsive to vehicle speed and means responsive to the position of said throttle said means being operable concurrently to cause actuation of said brakes only when said vehicle speed is below a predetermined minimum and said throttle is released.

4. In a vehicle having an accelerator, a braking system and a source of brake actuating power, means for controlling the flow of said power including: valve means responsive to the speed of said vehicle and adapted to open at a predetermined low speed and valve means responsive to the position of said accelerator and adapted to open when said accelerator is released, said valves being in series relation.

5. In a vehicle having a brake operating means, an accelerator pedal and a source of power for actuating said brake operating means, means in series relation with said source of power for controlling the passage of said power to said brake operating means including: means responsive to the speed of said vehicle to assume a power passing condition at substantially idling speed; and means responsive to the position of said accelerator pedal to assume a power passing condition upon release of said accelerator pedal.

6. In a vehicle having an engine, air intake means, an accelerator pedal and a braking system, a system for actuating said brakes comprising: brake applying means responsive to air intake pressures; conduit means for communicating said pressures to said brake applying means; pressure sensitive means in series therewith adapted to prevent communication of said pressure when said pressure is above a predetermined maximum absolute pressure and to permit communication when below; and valve means responsive to said accelerator pedal in series in said communicating conduit adapted to prevent said communication when said pedal is depressed and to permit said communication when said pedal is raised, said valve including means to relieve said pressure from said brake applying means when said pedal is depressed.

7. In a vehicle having an engine, an accelerator pedal, air intake means, and a braking system, means for actuating said brakes including: brake operating means responsive to pressure in said air intake means; means responsive to said pressure adapted to cause communication of said pressure to said brake operating means; and means responsive to the position of said accelerator pedal in series relation with said force applying means to interrupt the application of said force when said pedal is depressed.

8. In a vehicle having an engine, air intake means, an accelerator pedal, and a braking system, a system for actuating said brakes comprising: brake applying means responsive to air intake pressures; conduit means for communicating said pressures to said brake applying means; valve means in series therewith adapted to control communication of said pressure; means adapted to operate said valve between open and closed position in response to the speed of said vehicle; and means responsive to said accelerator pedal in series in said communicating conduit adapted to prevent said communication when said pedal is depressed and to permit said communication when said pedal is raised.

9. In a vehicle having an engine, an accelerator foot pedal, air intake means and a braking system; means for actuating said braking system including: a fluid motor; conduit means communicating said fluid motor with said air intake means; means responsive to pressures in said air intake means in series with said fluid motor adapted to permit communication of said air intake pressures to said motor up to predetermined absolute pressure levels; and override means in series with said pressure responsive means to permit communication of said intake pressures to said fluid motor when said pedal is in released position, and to release pressure from said fluid motor when said pedal is depressed.

10. In a vehicle having an engine, a throttle, and brakes, the combination of: motor means for causing actuation of said brakes; a source of power for operating said motor means; circuit connecting said motor and said power source; vehicle speed responsive means interposed in said circuit and operable to permit the flow of power therein only when the speed of said vehicle is below a predetermined value; and throttle responsive means interposed in said circuit to permit the flow of power therein only on release of said throttle whereby upon the concurrent operation of said means in said circuit said brakes are applied in a predetermined amount.

11. In a vehicle having an engine, air intake means, an accelerator pedal, and a braking system, a system for actuating said brakes comprising: brake applying means; pressure sensitive means responsive to air intake pressures adapted to cause actuation of said brake applying means when said pressure is below a predetermined maximum absolute pressure and to prevent actuation when above said maximum; and means responsive to said accelerator pedal in series between said brake actuating means and said air intake responsive means adapted to prevent said actuation when said pedal is depressed and to permit said actuation when said pedal is raised.

12. In a vehicle having an engine, an accelerator pedal, a source of electrical energy and a braking system, means for actuating said brakes including: a means electrically connected to said source of electrical energy for causing actuation of said braking system; first switching means in series with said source of electrical energy responsive to the speed of said vehicle to open position at speed above a predetermined value and to closed position below said predetermined value; second switching means in series with said first switching means responsive to the position of said accelerator pedal to open position when said pedal is depressed and to closed position when released.

13. In a vehicle having an engine, an accelerator pedal, a source of electrical energy, air intake means, and a braking system, means for actuating said braking system including: electro-magnetic means for actuating said brakes; an electrical circuit connecting said electromagnetic means to said source of electrical energy; means in series in said circuit responsive to the speed of said vehicle for opening or closing said circuit; and means in series in said circuit responsive to the position of said accelerator pedal for opening or closing said circuit.

14. Apparatus according to claim 1 in which the vehicle speed-responsive means includes a fluid pump having an inlet and a pressure side, a loop circuit through said pump, said circuit including an orifice on the pressure side thereof, and a pressure-actuated switch connected to said circuit between the orifice and the inlet side of the pump, said switch being opened by elevated pressures in said circuit, said switch being in series in said actuating means for prohibiting brake application of said braking system at elevated speeds.

15. In a vehicle having an engine, an accelerator pedal, and a braking system, including a brake, actuation means for said braking system comprising: power means connected to said braking system for applying an operating force thereto to apply said brakes; speed responsive means responsive to the speed of said vehicle; and accelerator pedal-responsive means in series relation with said vehicle speed responsive means, said speed responsive means and accelerator pedal responsive means being adapted to cause operation of said power means to apply the brake when the accelerator pedal is substantially released and the vehicle speed is simultaneously below a predetermined minimum value, said accelerator pedal-responsive means preventing operation of the power means when the accelerator pedal is substantially depressed, and the speed responsive means preventing operation of the power means when the vehicle speed is above said predetermined minimum value.

16. In a vehicle having an engine, an accelerator pedal, air intake means associated with said engine, and a braking system including a brake, actuation means for said braking system comprising: power means connected to said braking system for applying an operating force thereto to apply said brakes; pressure responsive means which are responsive to the pressure in said air intake means; and accelerator pedal-responsive means in series with said pressure responsive means, said pressure responsive means and pedal responsive means being adapted to cause operation of said power means to apply the brake when the vehicle speed is below a predetermined minimum value and the accelerator pedal is substantially released, and said pressure-responsive means preventing operation of said power means when the vehicle speed is above said predetermined minimum value, and the accelerator pedal-responsive means preventing operation of said power means when the pedal is substantially depressed.

17. In a vehicle having an engine, an accelerator pedal, air intake means associated with said engine, and a braking system including a brake, actuation means for applying said brakes comprising: power means connected to said brakes which are actuable for applying an operating force thereto to apply said brake; pressure-responsive means which are responsive to the pressure in said air intake means; a valve in series connection with said pressure responsive means, the position of said valve being controlled by the accelerator pedal, said pressure responsive means and valve being connected in controlling relationship to said power means, whereby when said pedal is not substantially depressed and said vehicle speed is simultaneously below a predetermined minimum value, the valve and pressure responsive means permit said power means to apply said brake, and when said vehicle speed is above said predetermined minimum value the pressure-responsive means prevents actuation of the power means, and when the pedal is substantially depressed, the valve prevents operation of said power means.

References Cited in the file of this patent

UNITED STATES PATENTS 2,521,593   McNutt _____ Sept. 5, 1950